(12) United States Patent
Agg (10) Patent No.: US 10,221,768 B2
(45) Date of Patent: Mar. 5, 2019

(54) HEAT EXCHANGER HAVING A COAXIAL OR CONCENTRIC TUBE CONSTRUCTION

(71) Applicant: ROLLS-ROYCE PLC, London (GB)

(72) Inventor: Michael John Agg, Bristol (GB)

(73) Assignee: ROLLS-ROYCE plc, London (GB)

( * ) Notice: Subject to any disclaimer, the term of this patent is extended or adjusted under 35 U.S.C. 154(b) by 472 days.

(21) Appl. No.: 14/881,722

(22) Filed: Oct. 13, 2015

(65) Prior Publication Data

US 2016/0131040 A1 May 12, 2016

(30) Foreign Application Priority Data

Nov. 10, 2014 (GB) .................................. 1419963.2

(51) Int. Cl.
*F02C 7/18* (2006.01)
*F28D 7/08* (2006.01)
(Continued)

(52) U.S. Cl.
CPC .............. *F02C 7/185* (2013.01); *B64D 33/08* (2013.01); *B64D 33/10* (2013.01); *F02C 3/10* (2013.01);
(Continued)

(58) Field of Classification Search
CPC . B64D 33/08; B64D 33/10; F02C 6/08; F02C 7/14; F02C 7/141; F02C 7/18; F02C 7/185; F02C 7/22; F02C 7/222; F02C 7/224; F02K 3/105; F02K 3/115; F05D 2250/36; F05D 2260/205; F05D 2260/213; F28D 7/02; F28D 7/024; F28D 7/026;
(Continued)

(56) References Cited

U.S. PATENT DOCUMENTS

| 4,548,257 A | 10/1985 | Williamson |
| 5,317,877 A * | 6/1994 | Stuart ..................... F02C 7/185 60/736 |

(Continued)

FOREIGN PATENT DOCUMENTS

| CN | 202973541 U | 6/2013 |
| EP | 0 138 677 A2 | 4/1985 |

(Continued)

OTHER PUBLICATIONS

May 11, 2015 Search Report issued in British Patent Application No. GB1419963.2.

(Continued)

*Primary Examiner* — Scott J Walthour
(74) *Attorney, Agent, or Firm* — Oliff PLC (57) ABSTRACT

A heat exchanger for use in high pressure environments, such as in a gas turbine engine, includes an outer casing, a tubular element within the outer casing and an inner sleeve within the tubular element. The tubular element has an outer surface and an inner surface. The outer casing and outer surface of the tubular element define a first annular passage through which a first fluid flow path extends. The inner sleeve and inner surface of the tubular element define a second annular passage through which a second fluid flow path extends. The first annular passage is sealed against the outer surface of the tubular element and the second annular passage is sealed within the inner surface of the tubular element.

19 Claims, 5 Drawing Sheets

(51) Int. Cl.

| | | |
|---|---|---|
| *F28D 7/16* | (2006.01) | |
| *F02C 7/224* | (2006.01) | |
| *F28D 7/04* | (2006.01) | |
| *F28D 7/02* | (2006.01) | |
| *F02C 7/14* | (2006.01) | |
| *B64D 33/08* | (2006.01) | |
| *B64D 33/10* | (2006.01) | |
| *F28D 7/10* | (2006.01) | |
| *F28F 1/36* | (2006.01) | |
| *F28F 1/34* | (2006.01) | |
| *F28F 1/14* | (2006.01) | |
| *F28F 1/38* | (2006.01) | |
| *F28F 1/42* | (2006.01) | |
| *F28F 1/16* | (2006.01) | |
| *F02C 3/10* | (2006.01) | |
| *F02C 9/18* | (2006.01) | |
| *F28D 21/00* | (2006.01) | |

(52) U.S. Cl.
CPC .............. *F02C 7/14* (2013.01); *F02C 7/224* (2013.01); *F02C 9/18* (2013.01); *F28D 7/02* (2013.01); *F28D 7/024* (2013.01); *F28D 7/04* (2013.01); *F28D 7/08* (2013.01); *F28D 7/082* (2013.01); *F28D 7/085* (2013.01); *F28D 7/10* (2013.01); *F28D 7/103* (2013.01); *F28D 7/106* (2013.01); *F28D 7/1607* (2013.01); *F28F 1/14* (2013.01); *F28F 1/16* (2013.01); *F28F 1/34* (2013.01); *F28F 1/36* (2013.01); *F28F 1/38* (2013.01); *F28F 1/42* (2013.01); *F28F 1/422* (2013.01); *F28F 1/424* (2013.01); *F02C 7/18* (2013.01); *F05D 2220/32* (2013.01); *F05D 2250/25* (2013.01); *F05D 2250/36* (2013.01); *F05D 2260/205* (2013.01); *F05D 2260/213* (2013.01); *F28D 2021/0026* (2013.01); *F28F 2215/00* (2013.01); *F28F 2215/02* (2013.01); *F28F 2235/00* (2013.01)

(58) Field of Classification Search
CPC ... F28D 7/04; F28D 7/08; F28D 7/082; F28D 7/085; F28D 7/10; F28D 7/103; F28D 7/106; F28D 7/1607; F28D 2021/0026; F28F 1/14; F28F 1/16; F28F 1/34; F28F 1/36; F28F 1/38; F28F 1/42; F28F 1/422; F28F 1/424; F28F 2215/00; F28F 2215/02; F28F 2235/00
See application file for complete search history.

(56) References Cited

U.S. PATENT DOCUMENTS

| | | |
|---|---|---|
| 8,251,133 B2 | 8/2012 | Van Decker et al. |
| 2008/0020247 A1* | 1/2008 | Valensa .................. F28D 7/10 429/439 |
| 2009/0166019 A1* | 7/2009 | Tokizaki ................ F25B 40/00 165/181 |
| 2010/0139900 A1* | 6/2010 | Thompson ............ F28D 9/0043 165/166 |
| 2012/0222845 A1 | 9/2012 | Kinder et al. |
| 2012/0304662 A1 | 12/2012 | Prociw et al. |
| 2014/0245768 A1* | 9/2014 | Rockenfeller ........ F25B 27/007 62/235.1 |

FOREIGN PATENT DOCUMENTS

| | | |
|---|---|---|
| EP | 0 449 124 A1 | 10/1991 |
| EP | 2 530 280 A2 | 12/2012 |
| GB | 935091 A | 8/1963 |
| GB | 2065861 A | 7/1981 |
| WO | 91/02146 A1 | 2/1991 |
| WO | 00/37872 A1 | 6/2000 |

OTHER PUBLICATIONS

Apr. 6, 2016 Partial Search Report issued in European Patent Application No. 15189507.
Aug. 1, 2016 Extended Search Report issued in European Patent Application No. 15189507.5.

* cited by examiner

HEAT EXCHANGER HAVING A COAXIAL OR CONCENTRIC TUBE CONSTRUCTION

FIELD OF THE INVENTION

The present invention relates to a heat exchanger, particularly, but not exclusively to a heat exchanger for a gas turbine engine.

BACKGROUND OF THE INVENTION

It is known to use a heat exchanger in a gas turbine engine for heating fuel prior to combustion using heat contained within the high pressure air leaving the combustor or using heat contained within engine's oil system. The pressurised air/oil cooled within the heat exchanger is used to cool turbine components.

Various types of heat exchangers are known including tubular heat exchangers and plate/fin heat exchangers.

Tubular heat exchangers comprise a tubular shell through which a first fluid flows. The tubular shell may contain baffles for directing the flow of the first fluid along a convoluted path from an inlet to an outlet. A number of tubes (a tube bundle) carrying a second fluid extend from a tube manifold or tube sheet within the tubular shell so that heat exchange can occur between the first and second fluids through the walls of the tubes. Tubular heat exchangers are commonly used where one or both of the fluids is/are at a high pressure.

Plate/fin heat exchangers comprise a series of stacked plates sandwiching finned chambers which are enclosed at the edges by side bars. Separate first and second fluid streams flow through alternate chambers of the heat exchanger allowing heat transfer between the fluids in adjacent chambers. Plate/fin heat exchangers are suitable for use with high pressure fluids as the fins provide structural integrity to the structure.

Assembly and sealing of these known heat exchangers is typically by brazing. For example, in the tubular heat exchanger, the tubes of the tube bundle are connected to the tube manifold (which is enclosed within the tubular shell) by brazing and, in the plate/fin heat exchanger, the side bars are affixed by brazing. Failure of these brazed joints will lead to mixing of the two fluids which can be hazardous.

US 2012/0304662 describes a heat exchanger for a gas turbine engine comprising an annular duct housing two sets of inner and outer tubes. Two fuel conduits are defined between the inner and outer tubes with air conduits defined between the annular duct and the outer tubes and within the inner tubes. The inner and outer tubes defining the fuel conduits are sealed onto inlet and outlet end fittings using brazed joints. These brazed joints are in contact with the air conduit such that failure of the joint will lead to hazardous mixing of the fuel and compressed air.

The present invention aims to ameliorate the problems associated with the prior art.

SUMMARY OF THE INVENTION

In a first aspect, the present invention provides a heat exchanger comprising:
an outer casing;
a tubular element within said outer casing, said tubular element having an outer surface and an inner surface;
an inner sleeve within said tubular element,
said outer casing and outer surface of said tubular element defining a first annular passage through which a first fluid flow path extends,
said inner sleeve and inner surface of said tubular element defining a second annular passage through which a second fluid flow path extends,
wherein said first annular passage is sealed against the outer surface of the tubular element and said second annular passage is sealed within the inner surface of the tubular element.

All sealing of the second annular passage may occur within the inner surface of the tubular element. More specifically all joint sealing material may be provided within the inner surface of the tubular element.

By sealing the first annular passage (through which the first fluid flow path extends) against the outer surface of the tubular element and sealing the second annular passage (through which the second fluid flow path extends) within the inner surface of the tubular element, the tubular element is able to function as a physical barrier preventing any mixing of the two fluids in the event of leakage from the first and/or second annular passage(s). Instead, fluid leaks escape to the surrounding atmosphere. The defined arrangement means that there are no seals which are in direct contact with both the first and second fluid flow path.

Optional features of the first aspect of the present invention will now be set out. These are applicable singly or in any combination.

In some embodiments, the outer casing is sealed to the outer surface of the tubular element.

In some embodiments, the inner sleeve has a shorter axial length than the tubular element In some embodiments, the second annular passage is in fluid communication with an inlet adapter at an inlet end of the heat exchanger and an outlet adapter at an outlet end of the heat exchanger. In these embodiments, the inlet and outlet adapters may be sealed against the inner surface of the tubular element.

The adapters may be threaded and cooperate with corresponding threads on the inner surface of the tubular element.

The fluid communication between the second annular passage and the inlet/outlet adapters may be provided by at least one respective aperture (e.g. slot, hole, cut-out) in each axial end of the inner sleeve. The inner sleeve may comprise a blanking wall across its bore to prevent fluid communication through the bore of the inner sleeve.

In some embodiments, the first annular passage is sealed against the outer surface of the tubular element and/or the second annular passage is sealed within the tubular element and/or the adapters are sealed against the inner surface of the tubular element by a respective mechanical seal (as opposed to brazing). For example, the mechanical seal may be a gasket (e.g. a ring gasket or a spiral wound gasket), an o-ring (e.g. formed of an elastomeric material), a c-ring (e.g. a metallic C-section ring seal or a multiple piston ring seal (e.g. a metallic multiple piston ring seal).

In some embodiments, the outer casing comprises a first outlet and an inlet. The inlet is axially spaced from the first outlet. In some embodiments, the outer casing further comprises a second outlet and the inlet is axially spaced between the first outlet and the second outlet such that the first annular passage/first fluid flow path comprises a first portion extending from the inlet to the first outlet and a second portion extending (in an opposite axial direction) from the inlet to the second outlet.

In some embodiments, the first annular passage is divided by axially extending, circumferentially spaced radial outer fins. The outer fins may extend from the outer surface of the tubular element. The outer fins divide the first annular passage/first fluid flow path into a series of axially aligned channels.

The outer fins may be integral with the outer surface of the tubular element e.g. they may be machined into the outer surface of the tubular element e.g. by electro-discharge wire cutting.

In some embodiments, the second annular passage is divided by inner fins. The inner fins may extend from the inner surface of the tubular element. The inner fins may be integral with the inner surface of the tubular element e.g. they may be machined into the inner surface of the tubular element e.g. by electro-discharge wire cutting.

In some embodiments, the inner fins are axially extending, circumferentially spaced radial inner fins which divide the second annular passage/second fluid flow path into a series of axially aligned channels.

The axially extending, circumferentially spaced radial inner fins may be adapted (e.g. by joining some fins and/or shortening some fins) to divide the second annular passage into at least one but preferably a plurality of convoluted channels, each convoluted channel having an inlet, a series of axially aligned portions with adjacent axially aligned portions being interconnected at their axial ends and an outlet. For example, each convoluted channel may comprise three axially aligned portions formed by shortening two adjacent inner fins. In some embodiments there are four convoluted channels, each convoluted channel in fluid communication with the respective aperture (e.g. slot, hole, cut-out) in each axial end of the inner sleeve.

In these embodiments, in use, the second fluid flow path passes along the axial length of the inner sleeve multiple times (e.g. three times) thus increasing the amount of time that the first fluid remains within the heat exchanger.

In some embodiments, the second annular passage is divided by spirally/helically extending, circumferentially spaced radial inner fins (i.e. a multi-start internal thread). The inner fins divide the second annular passage/second fluid flow path into a series of aligned spiral/helical channels.

In some embodiments, the tubular element and inner and outer fins are all integral i.e. a single, unitary element. For example the tubular element may be a forged metal element with inner and outer fins machined onto its inner and outer surfaces.

The tubular element may have a wall thickness (i.e. a distance between the inner and outer surface) of 1-4 mm. Some embodiments have a wall thickness of around 2 mm.

In a second aspect, the present invention provides a heat exchanger comprising:
an outer casing;
a tubular element within said outer casing, said tubular element having an outer surface with outer fins and an inner surface with inner fins;
said outer casing and outer surface of said tubular element defining a first annular passage through which a first fluid flow path extends,
said inner surface of said tubular element defining a second passage through which a second fluid flow path extends,
wherein said outer fins are integral with the outer surface of the tubular element and/or the inner fins are integral with the inner surface of the tubular element.

By providing a tubular element with integral fins provided on its surface(s), fabricated joints between the fins and the tubular element can be reduced/eliminated thus reducing/eliminating the number of joints which can fail in a high pressure environment.

Optional features of the second aspect of the present invention will now be set out. These are applicable singly or in any combination.

In some embodiments, both the inner and outer fins are integral with the respective surface of the tubular element i.e. the tubular element and inner/outer fins are a single, unitary element. For example the tubular element may be a forged metal element with inner and outer fins machined onto its inner and outer surfaces.

In some embodiments, the outer fins are axially extending, circumferentially spaced radial outer fins. The outer fins divide the first annular passage/first fluid flow path into a series of axially aligned channels.

The outer fins may be machined into the outer surface of the tubular element e.g. by electro-discharge wire cutting.

In some embodiments, the inner fins are axially extending, circumferentially spaced radial inner fins. The inner fins divide the second fluid flow path into a series of axially aligned channels.

In some embodiments, the axially extending, circumferentially spaced radial inner fins are adapted (e.g. by joining some fins and/or shortening some fins) to divide the second fluid flow path into at least one but preferably a plurality of convoluted channels, each convoluted channel having an inlet, a series of axially aligned portions with adjacent axially aligned portions being interconnected at their axial ends, and an outlet. For example, each convoluted channel may comprise three axially aligned portions formed by shortening two adjacent inner fins. In some embodiments there are four convoluted channels, each convoluted channel in fluid communication with the respective aperture (e.g. slot, hole, cut-out) in each axial end of the inner sleeve.

In these embodiments, in use, the second fluid flow path passes along the axial length of the inner sleeve multiple times (e.g. three times) thus increasing the amount of time that the first fluid remains within the heat exchanger.

In some embodiments, the inner fins are spirally/helically extending, circumferentially spaced radial inner fins (i.e. a multi-start internal thread). The inner fins divide the second fluid flow path into a series of aligned spiral/helical channels.

The inner fins may be machined into the inner surface of the tubular element e.g. by electro-discharge wire cutting or by thread cutting methods (e.g. thread milling) in the case of the helical/spiral fins.

The tubular element may have a wall thickness (i.e. a distance between the inner and outer surface) of 1-4 mm. Some embodiments have a wall thickness of around 2 mm.

In some embodiments, the heat exchanger further comprises an inner sleeve within said tubular element, the second passage being a second annular passage defined by the inner surface of the tubular element and the inner sleeve.

In some embodiments, the inner sleeve has a shorter axial length than the tubular element.

In some embodiments, the first annular passage is sealed against the outer surface of the tubular element and the second passage/second annular passage is sealed within the inner surface of the tubular element. All sealing of the second annular passage may occur within the inner surface of the tubular element. More specifically all joint sealing material may be provided within the inner surface of the tubular element.

In some embodiments, the outer casing is sealed to the outer surface of the tubular element.

In some embodiments, the second annular passage is in fluid communication with an inlet adapter at an inlet end of the heat exchanger and an outlet adapter at an outlet end of the heat exchanger. In these embodiments, the inlet and outlet adapters may be sealed against the inner surface of the tubular element.

The adapters may be threaded and cooperate with corresponding threads on the inner surface of the tubular element.

The fluid communication between the second annular passage and the inlet/outlet adapters may be provided by at least one respective aperture (e.g. slot, hole, cut-out) in each axial end of the inner sleeve. The inner sleeve may comprise a blanking wall across its bore to prevent fluid communication through the bore of the inner sleeve.

In some embodiments, the first annular passage is sealed against the outer surface of the tubular element and/or the second passage/second annular passage is sealed within the tubular element and/or the adapters are sealed against the inner surface of the tubular element by a mechanical seal (as opposed to brazing). For example, the mechanical seal may be a gasket (e.g. a ring gasket or a spiral wound gasket), an o-ring (e.g. formed of an elastomeric material), a c-ring (e.g. a metallic C-section ring seal or a multiple piston ring seal (e.g. a metallic multiple piston ring seal).

In some embodiments, the outer casing comprises a first outlet, and an inlet. The inlet is axially spaced from the first outlet. In some embodiments, the outer casing further comprises a second outlet and the inlet is axially spaced between the first outlet and the second outlet such that the first annular passage/first fluid flow path comprises a first portion extending from the inlet to the first outlet and a second portion extending (in an opposite axial direction) from the inlet to the second outlet.

In a third aspect, the present invention provides a gas turbine engine comprising a heat exchanger according to the first or second aspect of the present invention.

In a fourth aspect, the present invention provides use of the heat exchanger according to the first or second aspect of the present invention wherein the first fluid is air (e.g. hot compressed air) and the second fluid is fuel (e.g. high pressure fuel).

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
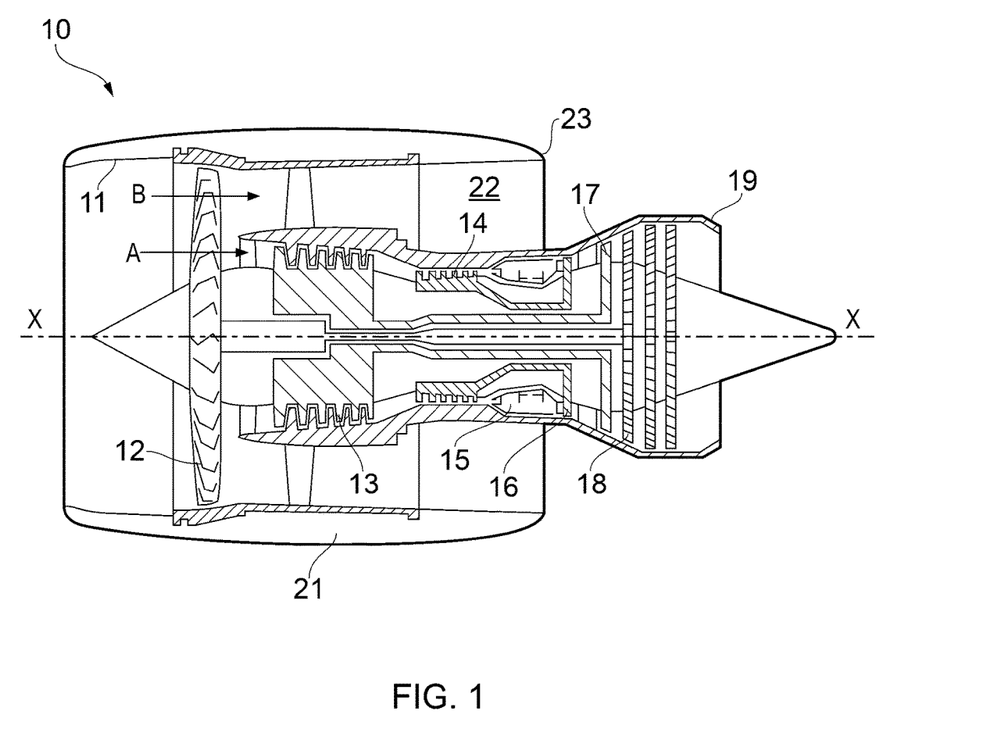
FIG. 1 shows a ducted fan gas turbine engine incorporating the invention.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

A heat exchanger according to the present invention may be provided on a casing surrounding the combustion equipment 15.

Figure 2:
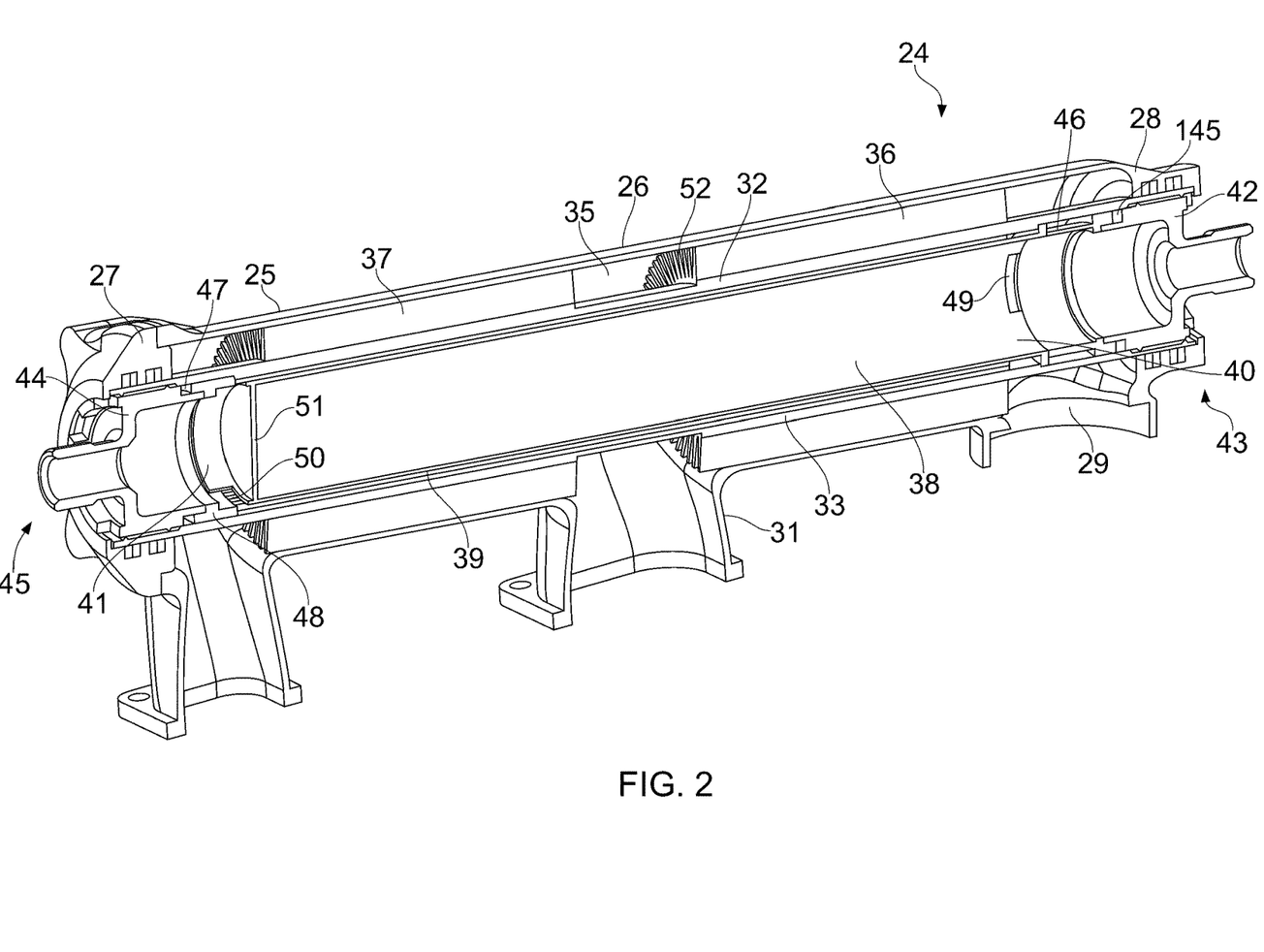
FIG. 2 shows a first embodiment of the present invention.
Figure 3:
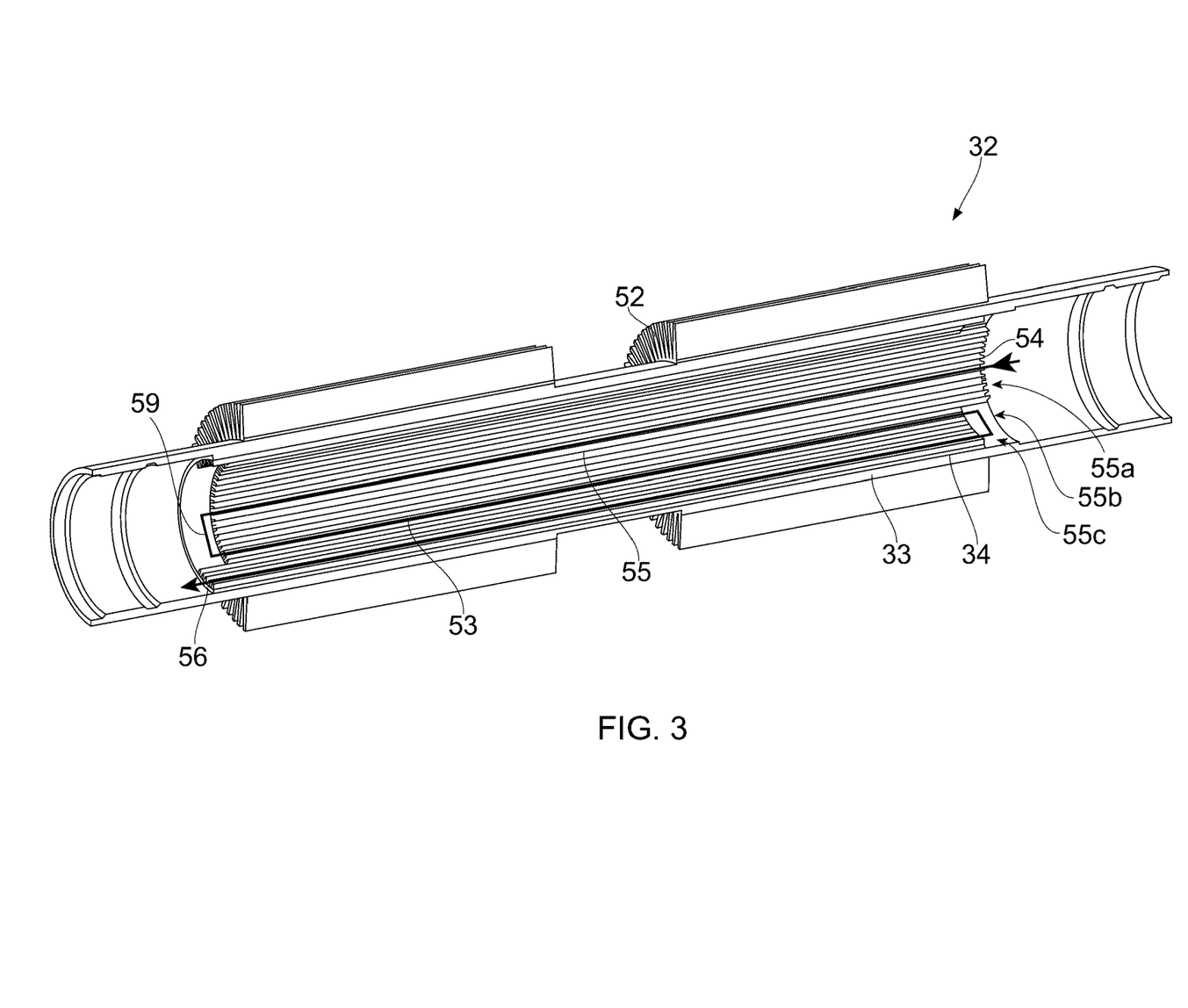
FIG. 3 shows the tubular element of the first preferred embodiment of the present invention.

FIGS. 2 and 3 show a first preferred embodiment of the present invention.

The heat exchanger 24 comprises an outer casing 25 which has a tubular (cylindrical) portion 26 extending between two end housings 27, 28. One end housing 28 is integral with the tubular portion 26 which facilitates manufacture.

The outer casing 25 comprises a first outlet 29, a second outlet 30 and an inlet 31. The inlet 31 is axially spaced between the first outlet 29 and the second outlet 30. The inlet 31 is equally spaced from the first outlet 29 and the second outlet 30.

The heat exchanger 24 further comprises a tubular element 32 (shown in isolation in FIG. 3) within said outer casing 25. The tubular element 32 is cylindrical and axially aligned with (and spaced from) the cylindrical portion 26 of the outer casing 25.

The tubular element 32 has an outer surface 33 and an inner surface 34.

The end housings 27, 28 of the outer casing 25 are sealed onto the outer surface 33 of the tubular element 32 by a respective metallic multiple piston ring seal.

The outer casing 25 and outer surface 33 of the tubular element 32 define a first annular passage 35 through which a high pressure air flow path extends.

The first annular passage 35/first fluid flow path comprises a first portion 36 extending from the inlet 31 to the first outlet 29 and a second portion 37 extending (in an opposite axial direction) from the inlet 31 to the second outlet 30.

The heat exchanger further comprises an inner sleeve 38 within the tubular element 32. The inner sleeve 38 is a cylindrical sleeve and is axially aligned with (and spaced from) the tubular element 32.

The inner sleeve 38 and inner surface 34 of the tubular element 32 define a second annular passage 39 through which a fuel flow path extends.

The inner sleeve 38 has a shorter axial length than the tubular element 32 such that the first axial end 40 and second axial end 41 of the inner sleeve 38 are contained within the tubular element 32.

The second annular passage 39 is in fluid communication with an inlet adapter 42 at an inlet end 43 of the heat exchanger 24 and an outlet adapter 44 at an outlet end 45 of the heat exchanger 24. The inlet adapter 42 is for connection (via appropriate tubing) to a fuel source (not shown). The outlet adapter 44 is for connection (via appropriate tubing) to the combustion equipment 15 (shown in FIG. 1).

The adapters 42, 44 are threaded and the threads cooperate with corresponding threads on the inner surface 34 of the tubular element. The inlet adapter 42 is further sealed against the inner surface 34 of the tubular element 32 by an elastomeric O-ring 145 which is compressed between the inlet adapter 42, the inner surface 34 of the tubular element 32 and an inlet spacer 46. The outlet adapter 44 is further sealed against the inner surface 34 of the tubular element 32 by an elastomeric O-ring 47 which is compressed between the outlet adapter 44, the inner surface 34 of the tubular element 32 and an outlet spacer 48. These threads and o-rings seal the second annular passage 39 within the tubular element 32.

Fluid communication between the second annular passage 39 and the inlet/outlet adapters 42, 44 is provided by respective cut-outs 49, 50 in each axial end 40, 41 of the inner sleeve 38. There are four such cut-outs, circumferentially spaced around the inner sleeve 28 at each axial end 40, 41.

Each cut-out 49, 50 provides fluid communication with the bore of the inner sleeve 38 at the respective axial end 40, 41 of the inner sleeve 38. The bore of the inner sleeve 38 is in fluid communication with the inlet adapter 42 at the inlet end 43 of the heat exchanger 24 and in fluid communication with the outlet adapter 44 at the outlet end 45 of the heat exchanger 24.

A blanking wall 51 is provided across the bore of the inner sleeve 38 proximal the second axial end 41 of the inner sleeve 38.

The first annular passage 35 is divided by axially extending, circumferentially spaced radial outer fins 52 which are machined (using electro-discharge wire cutting) onto and therefore integral with the outer surface 33 of the tubular element 32. The outer fins 52 divide the first annular passage/first fluid flow path into a series of axially aligned channels.

In the first embodiment, the second annular passage 39 is divided by axially extending, circumferentially spaced radial inner fins 53. The inner fins 53 are integral with the inner surface 34 of the tubular element 32 and are formed by machining the inner surface 34 of the tubular element 32 by electro-discharge wire cutting.

The inner fins 53 divide the second annular passage 39/second fluid flow path into a series of axially aligned channels extending from the first axial end 40 of the inner sleeve 38 to the second axial end 41 of the inner sleeve 38.

The axially extending, circumferentially spaced radial inner fins 53 are adapted to divide the second annular passage into a plurality of convoluted channels 59. Each convoluted channel 59 has an inlet 54 at the first axial end 40 of the inner sleeve 32, a series of axially aligned portions 55a, 55b, 55c with adjacent axially aligned portions being interconnected proximal the axial ends 40, 41 of the inner sleeve 32 and an outlet 56 at the second axial end 41 of the inner sleeve 32. In this embodiment, there are three axially aligned portions.

There are four such convoluted channels in this embodiment and each inlet 54 and outlet 56 are aligned with the four respective cut outs 49, 50 in the axial ends 40, 41 of the inner sleeve 38.

In use, the inlet adapter 42 is connected (via appropriate tubing) to a fuel source. Fuel enters the adapter 42 and passes through the four cut outs 49 in the first axial end 40 of the inner sleeve 38 to enter the second annular passage 39 between the inner sleeve 38 and the inner surface 34 of the tubular element 32. The fuel is channelled in a convoluted fuel flow path 59 by the inner fins 53, the fuel passing along the three axially aligned portions 55a, 55b, 55c of the respective one of the four convoluted channels. This ensures that the fuel travels along the length of the inner sleeve 38 multiple times.

Compressed air from the compressors 13, 14 enters the first annular passage 35 of the heat exchanger 24 via the inlet 31 which is spaced equidistant from the first outlet 29 and the second outlet 30. The air flow is divided between the first portion 36 which extends from the inlet 31 to the first outlet 29 and the second portion 37 which extends from the inlet 31 to the second outlet 30. The air travels along the axial channels defined by the outer fins 53 on the outer surface 33 of the tubular element 32.

Heat from the compressed air passes from the first annular passage 35 to the second annular passage 39 through the outer fins 52 and the tubular element 32 to heat the fuel as is passes along the convoluted channels defined by the inner fins 53. The compressed air is cooled in the process and the cooler air exiting the outlets 29, 30 is used to cool turbine elements.

Figure 4:
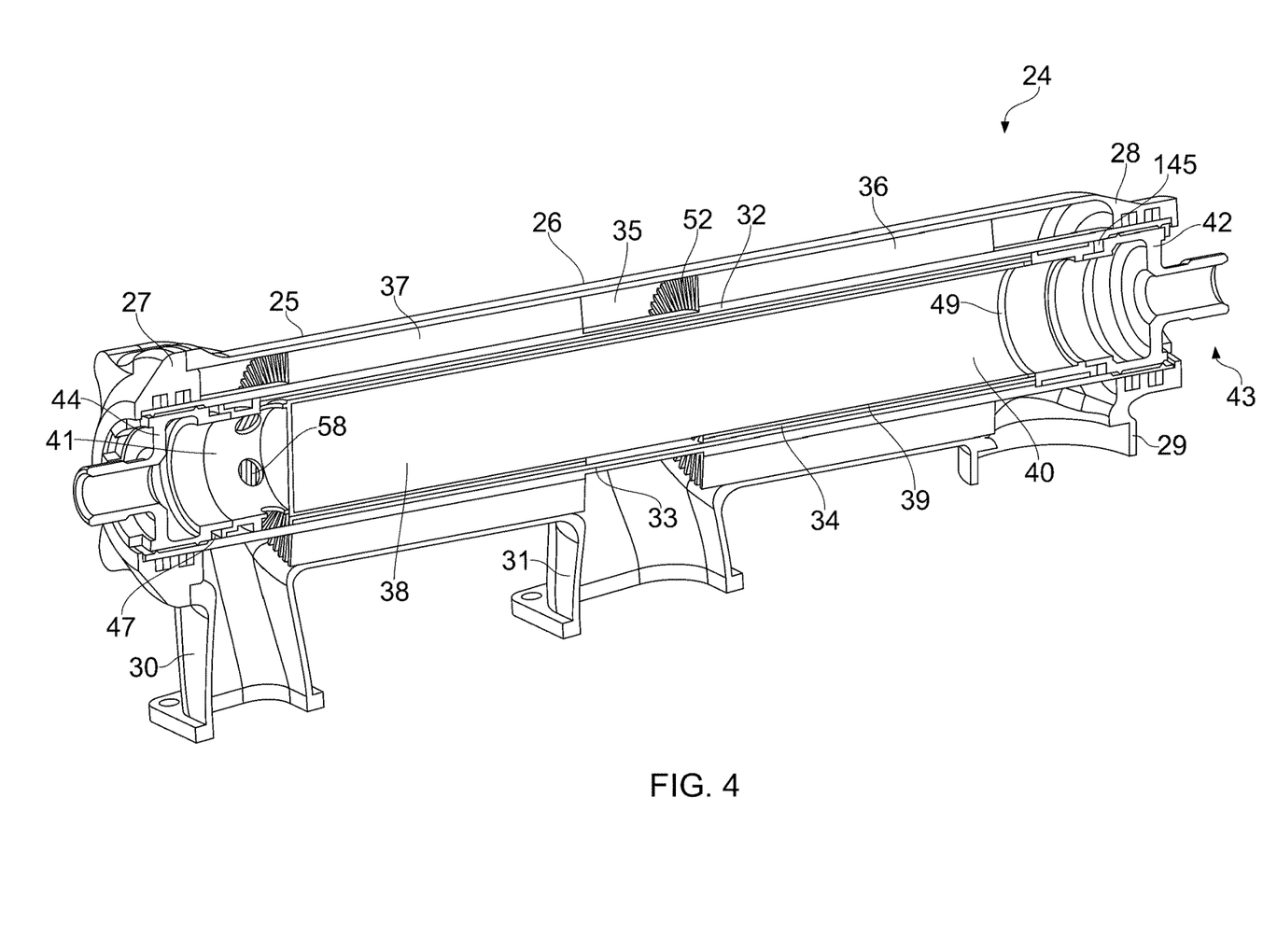
FIG. 4 shows a second embodiment of the present invention.
Figure 5:
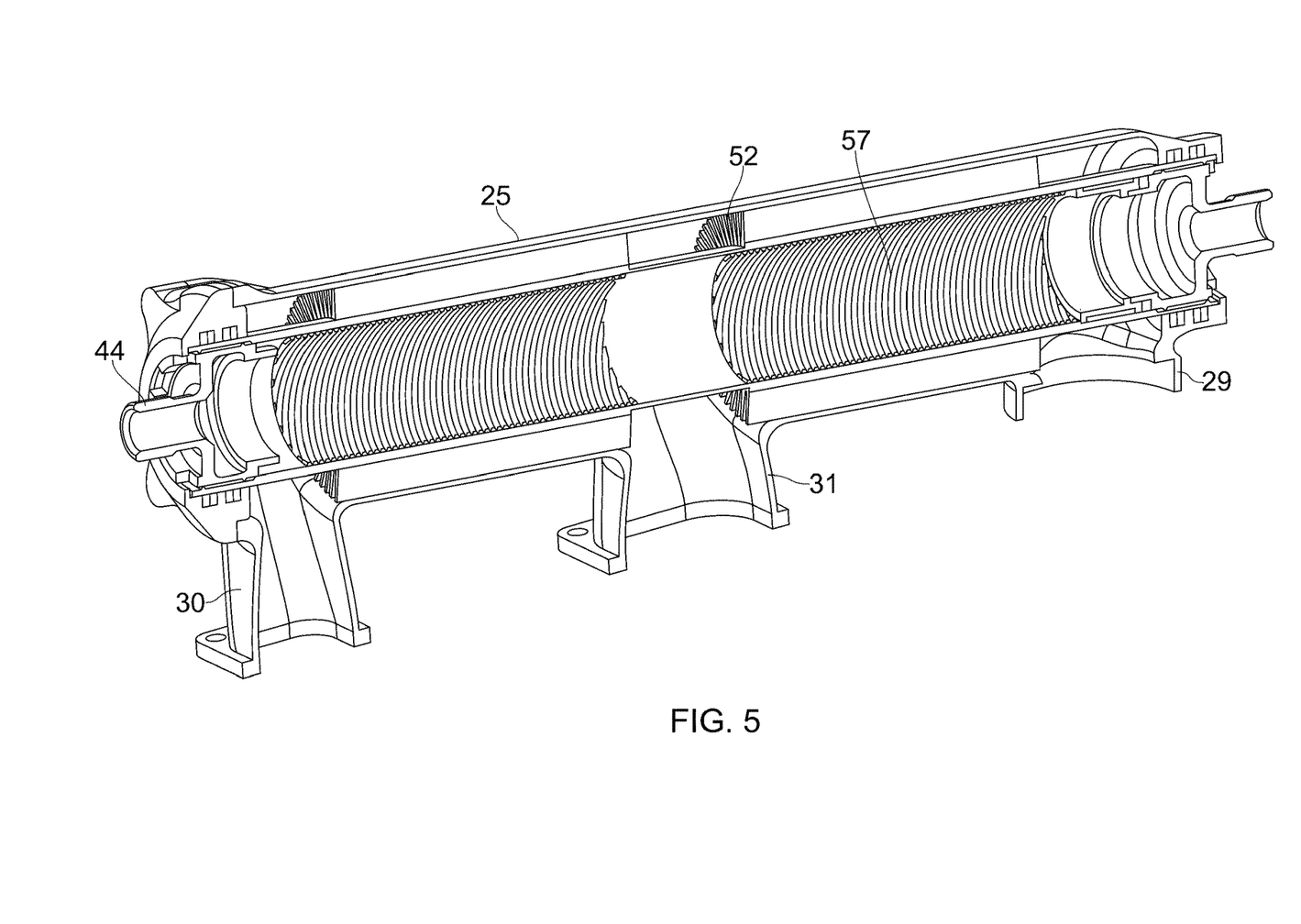
FIG. 5 shows the tubular element of the second preferred embodiment of the present invention.

A second embodiment of the present invention is shown in FIGS. 4 and 5. Many features are common between the two embodiments shown and the same reference numerals are used where appropriate.

In this embodiment, the inner surface 34 of the tubular element 32 comprises integral spirally/helically extending, circumferentially spaced radial inner fins 57 which formed into the inner surface 34 using thread milling. These inner fins 57 divide the second annular passage 39 into a series of aligned spiral/helical channels extending from the first axial end 40 of the inner sleeve 38 to the second axial end 41 of the inner sleeve 38.

The second axial end 41 of the inner sleeve 38 comprises a series of circular apertures 58 which provide fluid communication between the second annular passage 39 and the outlet adapter 44 (via the bore of the inner sleeve 38). At the first axial end 40 of the inner sleeve 38, a cut-out 49 is provided to allow fuel to enter the second annular passage.

Fuel entering the second annular passage 39 follows a spiral/helical path around the inside surface 34 of the tubular element, heat from the compressed air in the first annular passage 35 being transferred across the tubular element 32 into the fuel.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A heat exchanger defining a longitudinal axis, the heat exchanger comprising:
   an inlet end and an outlet end;
   an outer casing;
   a tubular element within said outer casing, said tubular element having an outer surface and an inner surface; and
   an inner sleeve within said tubular element, said outer casing and the outer surface of said tubular element defining a first annular passage through which a first fluid flow path extends, said inner sleeve and the inner surface of said tubular element defining a second annular passage through which a second fluid flow path extends, the second annular passage configured to receive fluid from an axially-oriented inlet at the inlet end and discharge fluid from an axially-oriented outlet at the outlet end, the axially-oriented inlet and the axially-oriented outlet each being coaxial with the longitudinal axis, wherein said first annular passage is sealed between the outer casing and the outer surface of the tubular element, and said second annular passage is sealed between the inner surface of the tubular element and the inner sleeve, and wherein the outer casing includes a first casing outlet, a second casing outlet, and a casing inlet, each of the first casing outlet and the second casing outlet and the casing inlet being disposed perpendicular to the longitudinal axis of the heat exchanger, the casing inlet being in fluid communication with each of the first casing outlet and the second casing outlet via the first annular passage, the casing inlet being axially spaced between the first casing outlet and the second casing outlet, the first annular passage comprising a first portion extending in a first axial direction, with respect to the longitudinal axis, from the casing inlet to the first casing outlet and a second portion extending in a second axial direction, opposite to the first axial direction, from the casing inlet to the second casing outlet.

2. The heat exchanger according to claim 1, wherein said outer surface of said tubular element comprises axially extending, circumferentially spaced radial outer fins.

3. The heat exchanger according to claim 1, wherein the inner surface of the tubular element comprises axially extending, circumferentially spaced radial inner fins.

4. The heat exchanger according to claim 1, wherein the inner surface of the tubular element comprises helically extending, circumferentially spaced radial inner fins.

5. The heat exchanger according to claim 2, wherein the inner surface of the tubular element comprises axially extending, circumferentially spaced radial inner fins, and wherein the tubular element and the axially extending, circumferentially spaced radial inner fins are a single, unitary element, or wherein the tubular element and the axially extending, circumferentially spaced radial inner fins and the axially extending, circumferentially spaced radial outer fins are a single, unitary element.

6. The heat exchanger according to claim 1, wherein the outer casing is sealed to the outer surface of the tubular element.

7. The heat exchanger according to claim 1, wherein the inner sleeve has a shorter axial length than the tubular element.

8. The heat exchanger according to claim 1, wherein the second annular passage is in fluid communication with an inlet adapter at the inlet end of the heat exchanger and an outlet adapter at the outlet end of the heat exchanger and wherein the inlet adapter and the outlet adapter are sealed against the inner surface of the tubular element.

9. The heat exchanger according to claim 1, wherein the outer casing is sealed against the outer surface of the tubular element by a mechanical seal and/or a mechanical seal is configured to provide sealing between the inner surface of the tubular element and the inner sleeve.

10. A gas turbine engine comprising the heat exchanger according to claim 1.

11. A heat exchanger defining a longitudinal axis, the heat exchanger comprising:

an outer casing;

a tubular element within said outer casing, said tubular element having an outer surface and an inner surface, the inner surface of the tubular element including axially extending, circumferentially spaced radial inner fins; and an inner sleeve within said tubular element, said outer casing and the outer surface of said tubular element defining a first annular passage through which a first fluid flow path extends, said inner sleeve and the inner surface of said tubular element defining a second annular passage through which a second fluid flow path extends, wherein said first annular passage is sealed between the outer casing and the outer surface of the tubular element, and said second annular passage is sealed between the inner surface of the tubular element and the inner sleeve, and wherein the axially extending, circumferentially spaced radial inner fins are adapted to divide the second fluid flow path into a plurality of convoluted channels, each convoluted channel having an inlet, an outlet, and a series of axially-oriented portions, the series of axially-oriented portions providing a convoluted fluid path from the inlet to the outlet, each axially-oriented portion being parallel with the longitudinal axis of the heat exchanger, wherein adjacent axially-oriented portions of the series of axially-oriented portions are fluidly interconnected at respective axial ends of the adjacent axially-oriented portions, the adjacent axially-oriented portions comprising a first axially-oriented portion and a second axially-oriented portion, wherein the first axially-oriented portion is configured to receive fluid from the inlet and direct the fluid along a first axial direction, with respect to the longitudinal axis of the heat exchanger, the second axially-oriented portion is configured to receive the fluid along the convoluted fluid path from the first axially-oriented portion, and the second axially-oriented portion is configured to flow the fluid along a second axial direction, the second axial direction being opposite to the first axial direction.

12. The heat exchanger according to claim 11, wherein said outer surface of said tubular element comprises axially extending, circumferentially spaced radial outer fins.

13. The heat exchanger according to claim 12, wherein the tubular element and the axially extending, circumferentially spaced radial inner fins are a single, unitary element, or the tubular element and the axially extending, circumferentially spaced radial inner fins and the axially extending, circumferentially spaced radial outer fins are a single, unitary element.

14. The heat exchanger according to claim 11, wherein the outer casing is sealed to the outer surface of the tubular element.

15. The heat exchanger according to claim 11, wherein the outer casing comprises a first casing outlet, a second casing outlet and a casing inlet, the casing inlet being axially spaced between the first casing outlet and the second casing outlet such that the first annular passage comprises a first portion extending along the first axial direction from the casing inlet to the first casing outlet and a second portion extending along the second axial direction from the casing inlet to the second casing outlet.

16. The heat exchanger according to claim 11, wherein the inner sleeve has a shorter axial length than the tubular element.

17. The heat exchanger according to claim 11, wherein the second annular passage is in fluid communication with an inlet adapter at an inlet end of the heat exchanger and an outlet adapter at an outlet end of the heat exchanger and wherein the inlet adapter and the outlet adapter are sealed against the inner surface of the tubular element.

18. The heat exchanger according to claim 11, wherein the outer casing is sealed against the outer surface of the tubular element by a mechanical seal and/or a mechanical seal is configured to provide sealing between the inner surface of the tubular element and the inner sleeve.

19. A gas turbine engine comprising the heat exchanger according to claim 11.

* * * * *